United States Patent
Park et al.

(10) Patent No.: US 7,666,305 B2
(45) Date of Patent: Feb. 23, 2010

(54) ROTOR FOR GENERATING VORTEX WATER FLOW, AND FILTERING APPARATUS EMPLOYING THE SAME

(75) Inventors: Gi-Teak Park, Gyeongsangnam-do (KR); Sang-Wook Kim, Chungcheongnam-do (KR)

(73) Assignee: Bookang Tech Co., Ltd. (KR)

( * ) Notice: Subject to any disclaimer, the term of this patent is extended or adjusted under 35 U.S.C. 154(b) by 413 days.

(21) Appl. No.: 10/598,782

(22) PCT Filed: Feb. 23, 2005

(86) PCT No.: PCT/KR2005/000485

§ 371 (c)(1),
(2), (4) Date: Sep. 11, 2006

(87) PCT Pub. No.: WO2005/087354

PCT Pub. Date: Sep. 22, 2005

(65) Prior Publication Data

US 2007/0144956 A1    Jun. 28, 2007

(30) Foreign Application Priority Data

Mar. 11, 2004 (KR) .................... 10-2004-0016400

(51) Int. Cl.
*B01D 63/16* (2006.01)
*B01D 61/00* (2006.01)

(52) U.S. Cl. .................... 210/321.63; 210/321.67; 210/321.68; 210/380.1

(58) Field of Classification Search ....................... None
See application file for complete search history.

(56) References Cited

U.S. PATENT DOCUMENTS

| 4,066,546 | A | * | 1/1978 | Sasaki | 210/660 |
| 4,312,756 | A | * | 1/1982 | Hug | 210/330 |
| 5,925,247 | A | * | 7/1999 | Huebbel | 210/321.75 |
| 5,993,674 | A | * | 11/1999 | Rolchigo et al. | 210/780 |
| 6,027,656 | A | * | 2/2000 | Henttonen et al. | 210/767 |
| 6,165,365 | A | * | 12/2000 | Salyer et al. | 210/650 |

* cited by examiner

*Primary Examiner*—Krishnan S Menon
(74) *Attorney, Agent, or Firm*—Ostrolenk Faber LLP

(57) ABSTRACT

Disclosed are a rotor for generating vortex water flow that creates shear intensity for removing solid material adhered to the separation membranes during the processing of water containing pollutant material, and a filtering apparatus employing the same. The rotor consists of a first rotor having first blades and a second rotor having second blades. The first and the second blades are extended in a radial direction from a rotational axis thereof, and are disposed at positions different from each other in the rotational axis direction. The first blades and the second blades have widths different from each other in a circumferential direction around the rotational axis, or disposed at positions different from each other in a circumferential direction. Protrusions can be attached on outer surfaces of the first blades and/or second blades. The pollutant material adhered to the separation membrane can be removed effectively since various types of vortex water flow are generated over wide range, and the energy loss of the filtering apparatus is reduced.

28 Claims, 8 Drawing Sheets

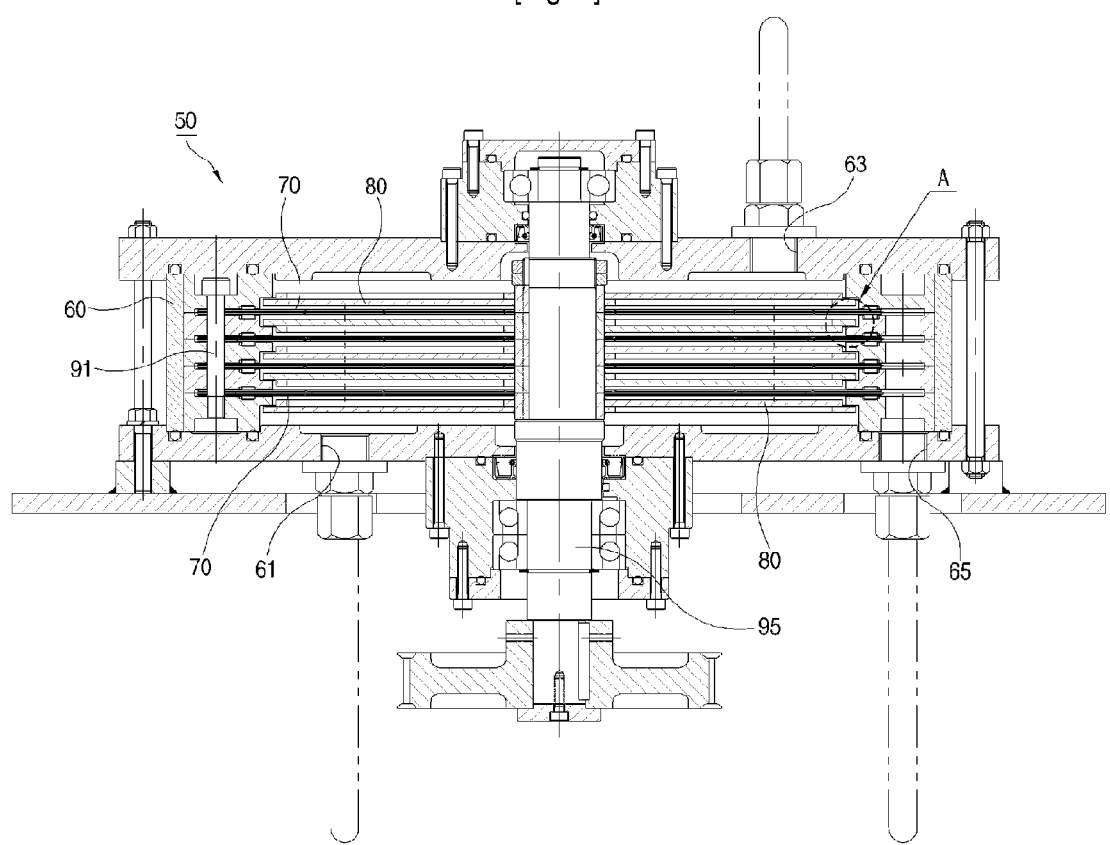
[Fig. 1]

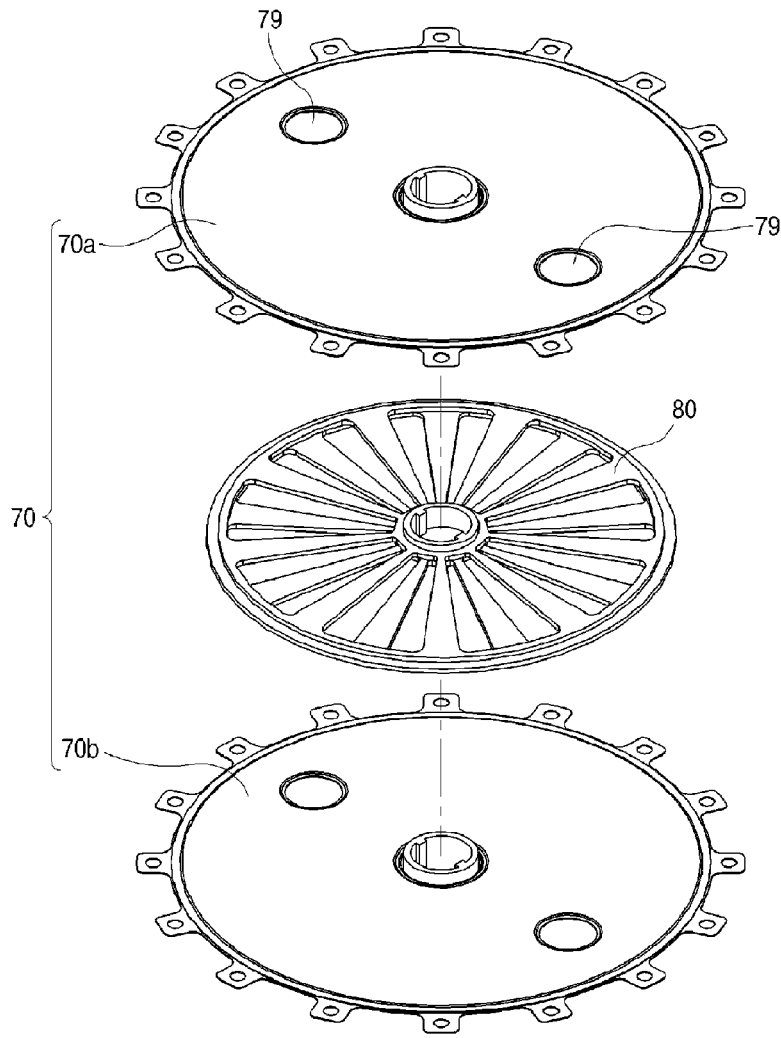
[Fig. 2]
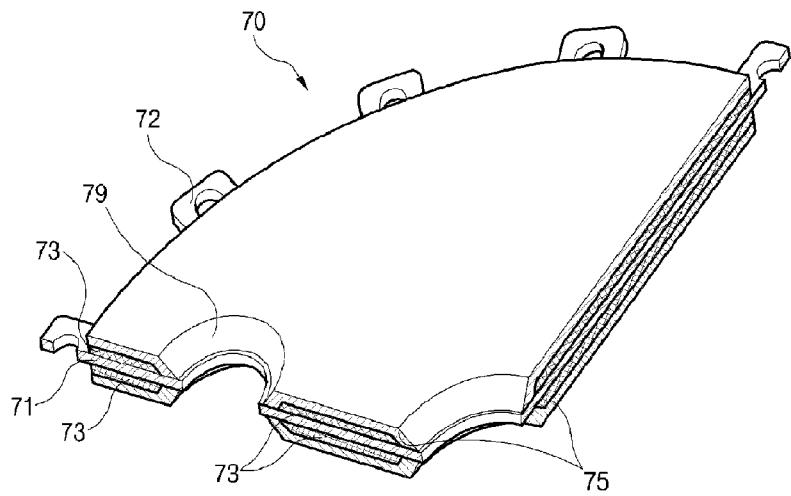
[Fig. 3]

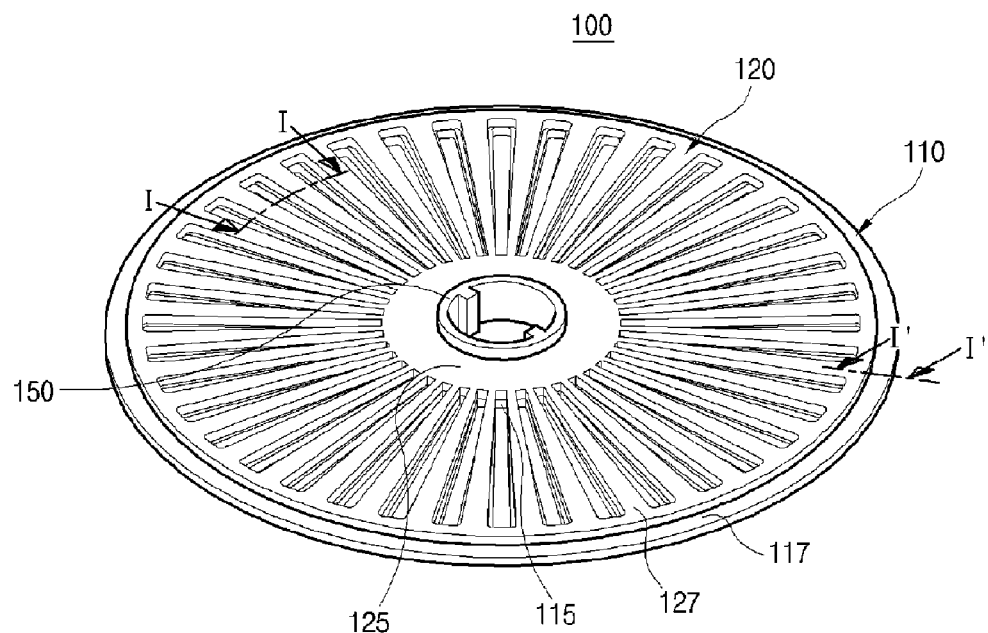
[Fig. 4]
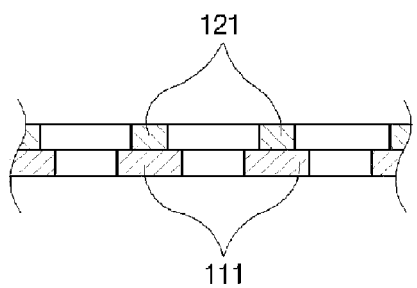
[Fig. 5]
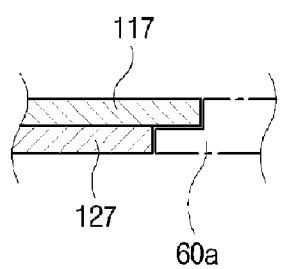
[Fig. 6]
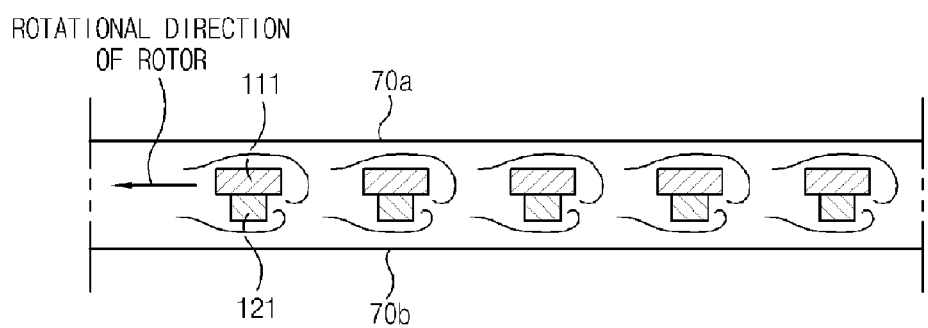
[Fig. 7]

[Fig. 8]
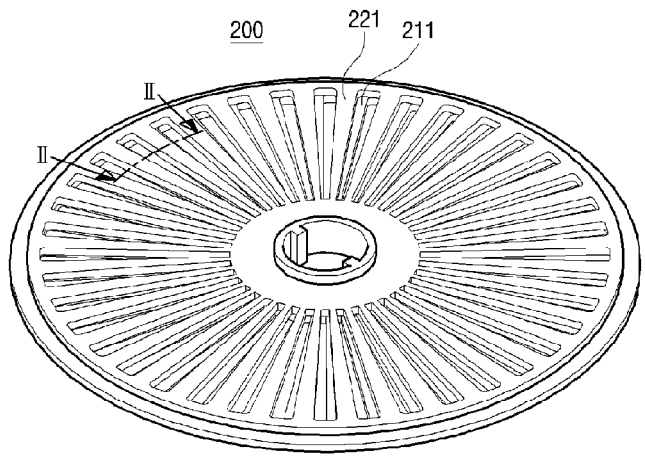
[Fig. 9]
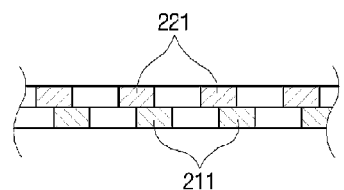
[Fig. 10]
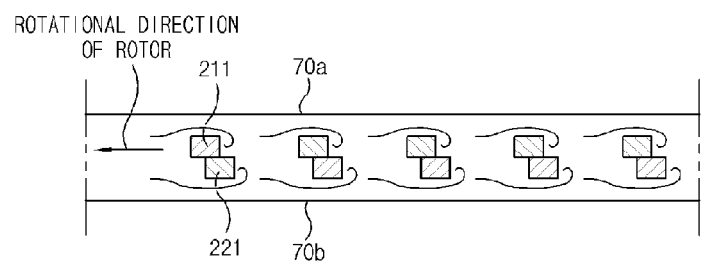
[Fig. 11]
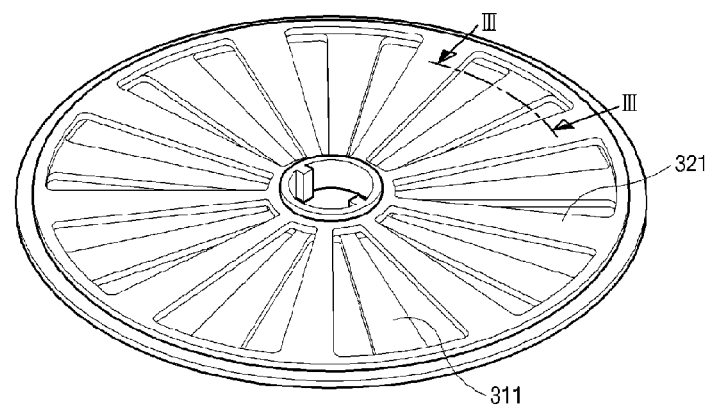
[Fig. 12]
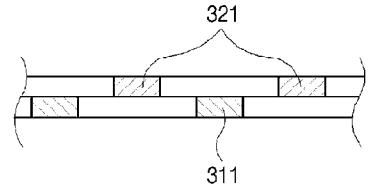

[Fig. 13]
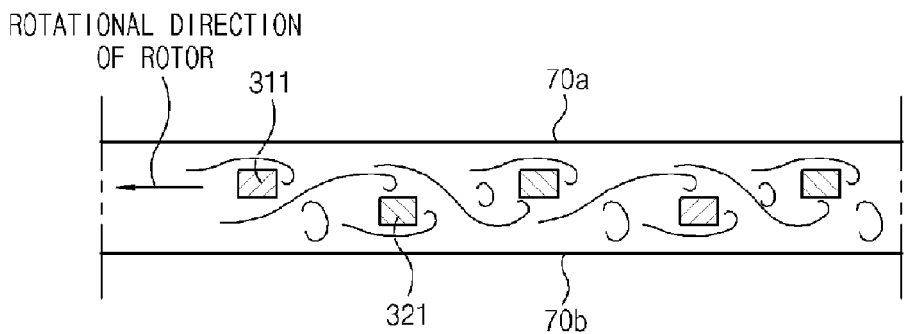
[Fig. 14]
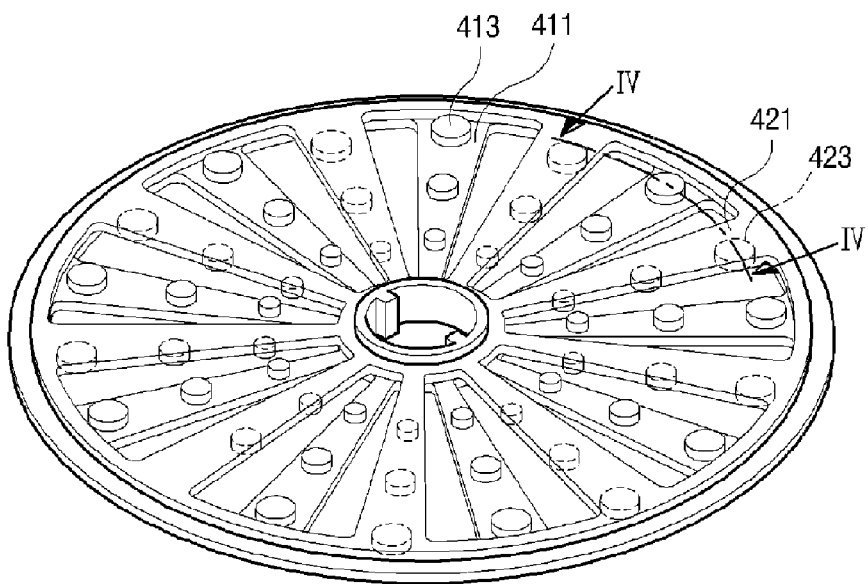
[Fig. 15]
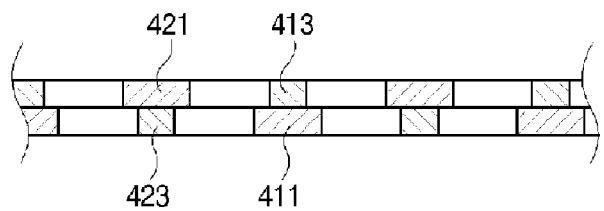
[Fig. 16]
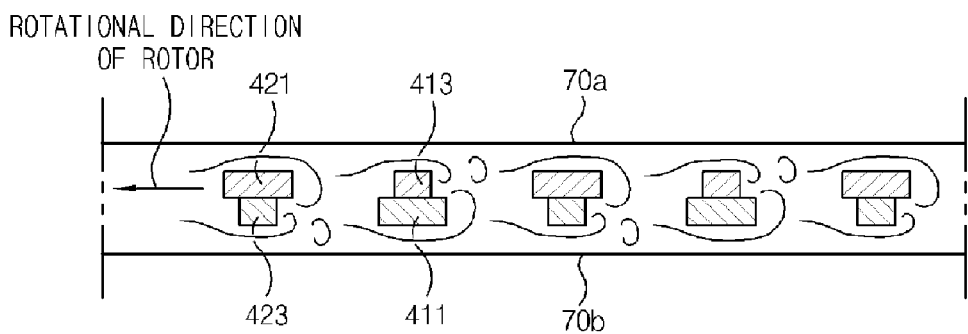

[Fig. 17]
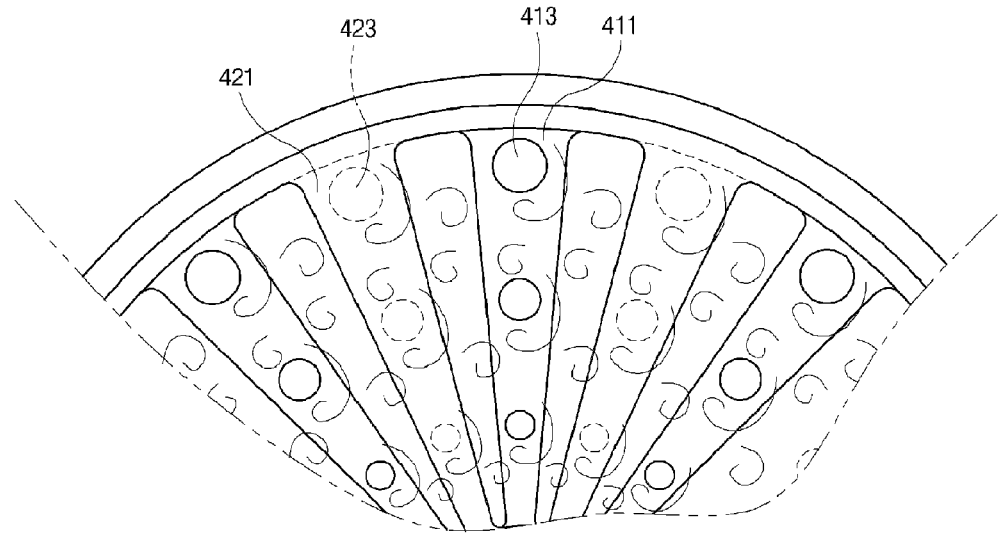
[Fig. 18]
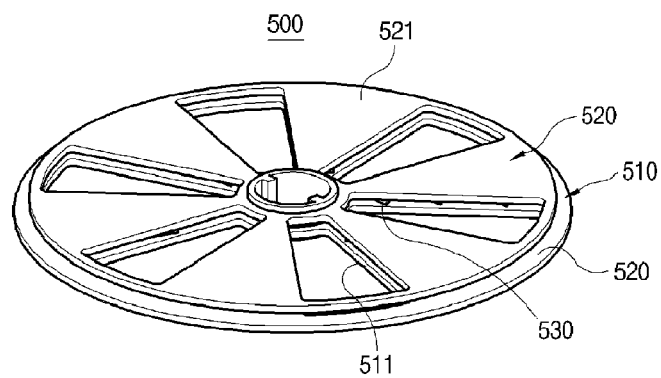
[Fig. 19]
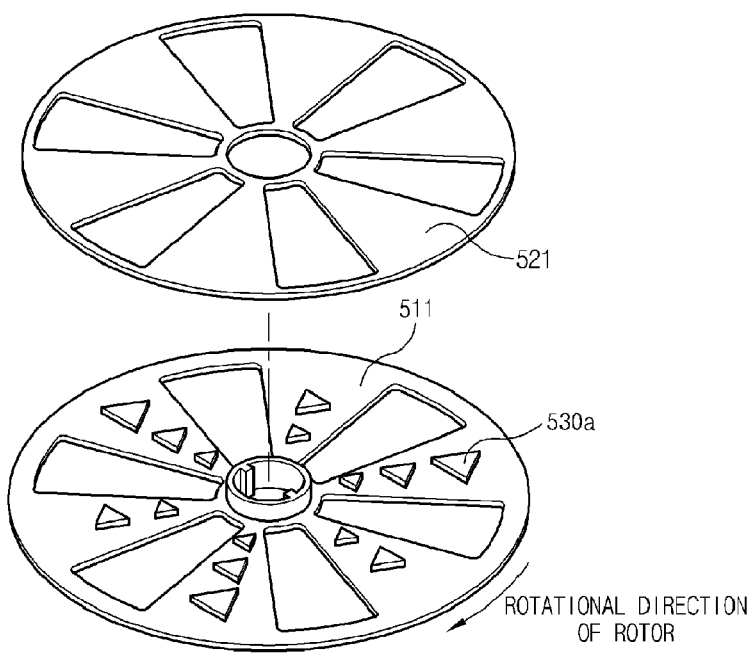

[Fig. 20]
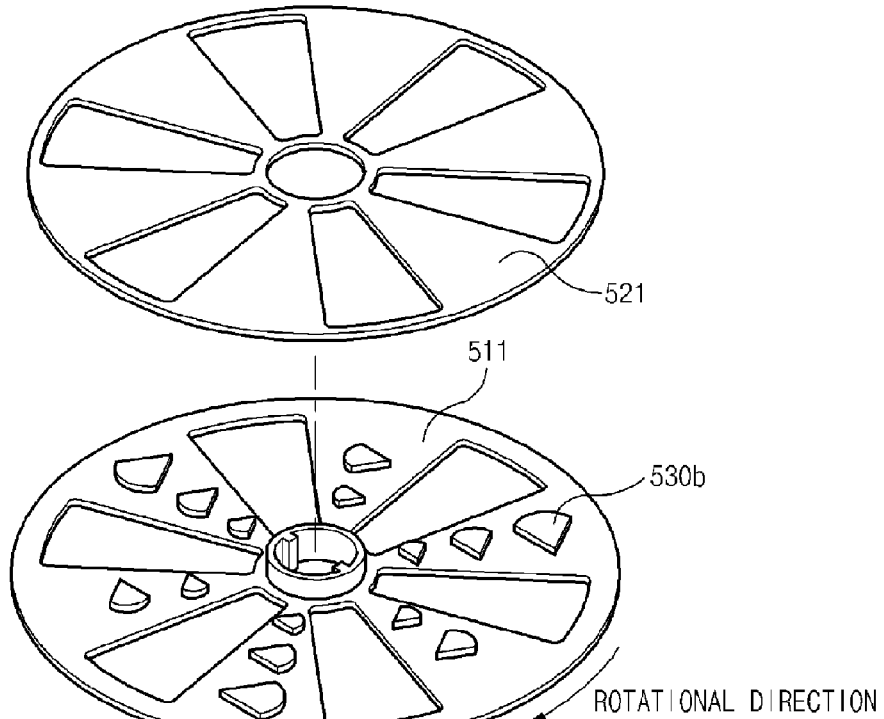
[Fig. 21]
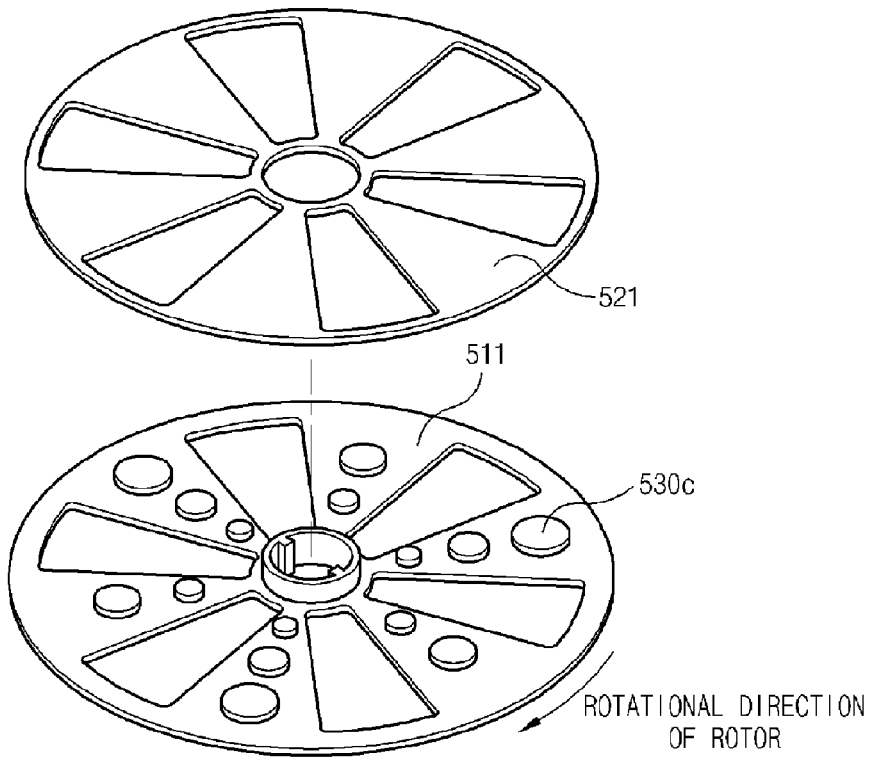

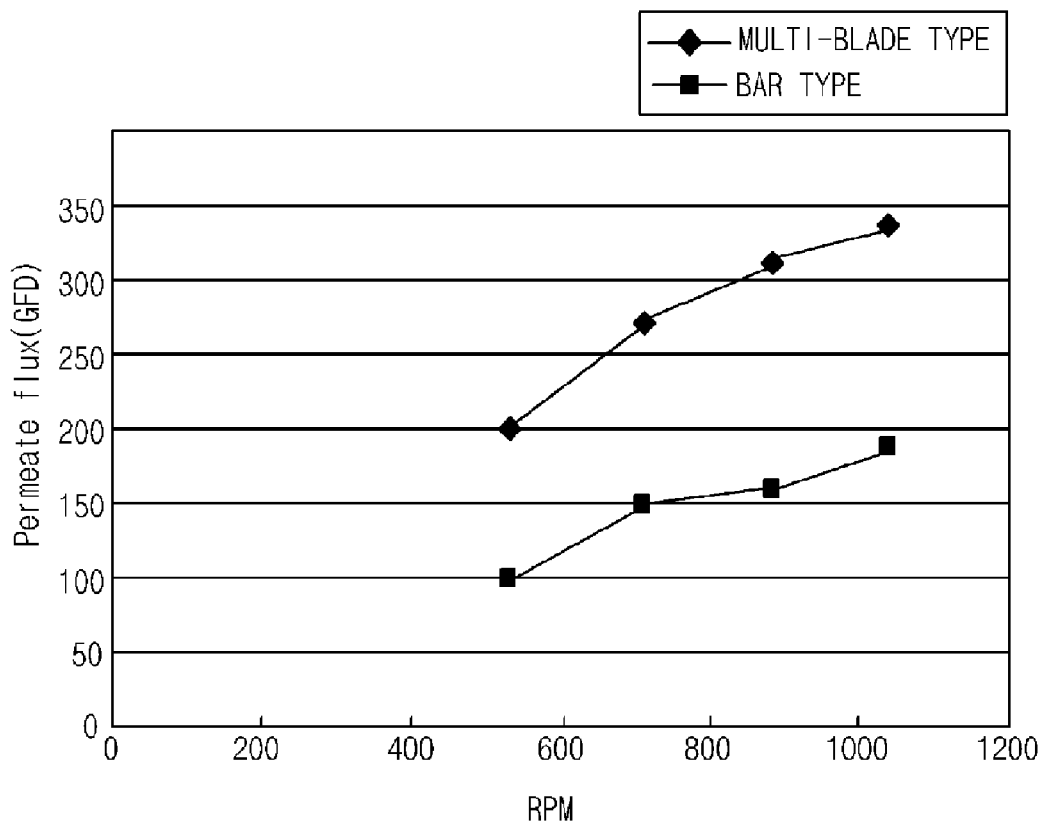
[Fig. 22]
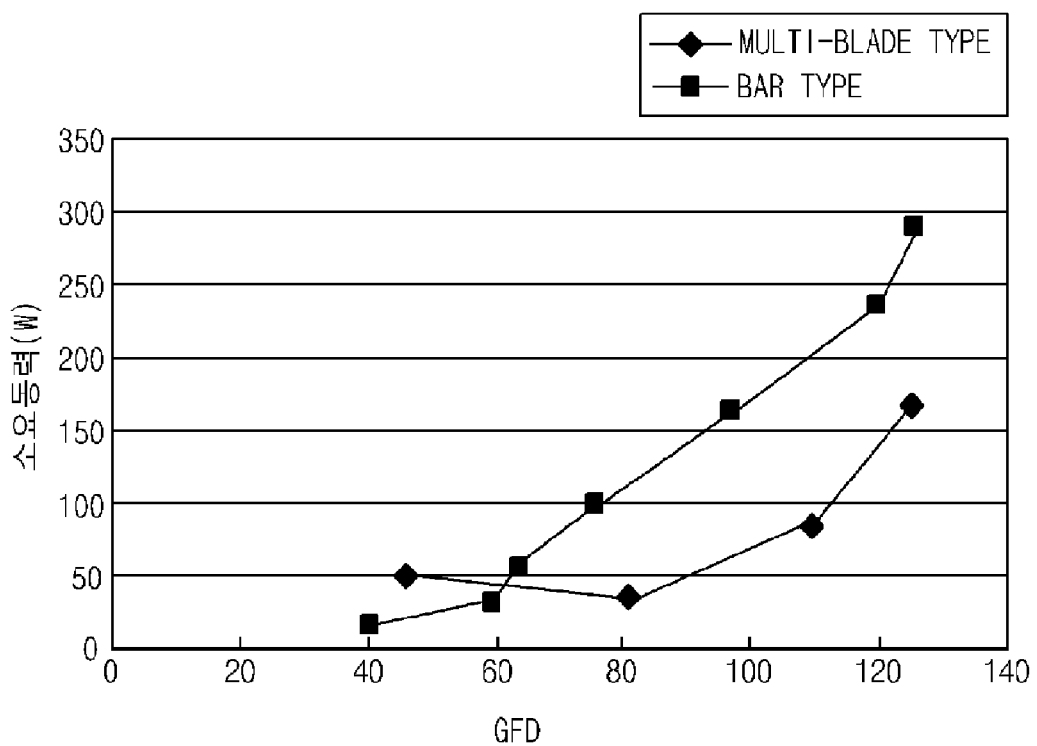
[Fig. 23]

ROTOR FOR GENERATING VORTEX WATER FLOW, AND FILTERING APPARATUS EMPLOYING THE SAME

CROSS REFERENCE TO RELATED APPLICATION

The present application is a 35 U.S.C. §§371 national phase conversion of PCT/ KR2005/000485, filed 23 Feb. 2005, which claims priority of Korean Patent Application No.10-2004-0016400, filed 11 Mar. 2004, which is herein incorporated by reference. The PCT International Application was published in the English language.

TECHNICAL FIELD

The present invention relates to a rotor for generating vortex water flow and a filtering apparatus employing the same, and more particularly, to a separation membrane filtering apparatus for filtering pollutant in water containing the pollutant material to a clean purified water, and a rotor for generating vortex water flow employed in the same.

BACKGROUND ART

The filtering apparatus for purifying water by filtering the pollutant in the polluted water is generally equipped with a porous membrane through which the polluted water passes. The pollutant in the polluted water is filtered by the porous membrane, by which the water passing through the porous membrane is discharged as a clean water.

The problem hardest to overcome in such a liquid-solid separation technique using the porous membrane is the abrupt declination of the liquid(or gas)-solid separation capacity of the separation membrane as the size of the pores that are the passages of the filtered liquid is reduced or the pores are blocked by the solid material adhered to the surface of the separation membrane or to the inner surface of the pores during the separation process. A variety of methods have been proposed in the past several decades in order to solve such a problem.

U.S. Pat. No. 3,437,208, Apparatus for Dynamic Filtration for Liquids, has proposed the structure that a rotary type (or fixed type) disks having blades are disposed between the piled fixed type (or rotary type) separation membranes and are rotated, thereby preventing the declination of shear intensity for the separation membranes by generating shear force for detaching the pollutant adhered to the surface of the separation membranes.

U.S. Pat. No. 4,036,759, Apparatus and System for Stabilizing the Disk element of a rotary concentrator for solids containing fluids, discloses the structure that a shoe is so mounted on the rotating part, that is, on the outer circumferential surface of the supporting plate of the rotary type disk or the rotary type separation membrane, as to rotate along the guide recess of a housing. According to such a construction, the problem occurring in the structure that the rotary type (or fixed type) disks are disposed between the piled fixed type (or rotary type) separation membranes as in the U.S. Pat. No. 3,437,208, that is, the deformation and the displacement in the shaft direction of the disk due to the pressure difference between both surfaces of the disk are prevented and therefore the stability of the system increases.

U.S. Pat. No. 5,275,725, Flat separation membrane leaf and rotary separation apparatus containing flat membranes, discloses the structure that a fixed type partitions made of flexible material are disposed between the piled rotary type separation membrane units to prevent the deformation by the pressure difference and the breakdown of the separation membranes caused by the same.

U.S. Pat. No. 5,415,781, Dynamic filter separator and separation device, and U.S. Pat. No. 5,679,245, Dynamic filter system, disclose the structure of separation apparatus having the fixed type separation membranes and the rotary type disks with blades.

In such conventional filtering apparatuses, as mentioned above, the disks are disposed between the separation membranes in order to reduce the adhesion of solid material on the surface of the membranes by generating strong shear rate on the surface of the separation membranes through the relative movement between the separation membranes and the disks. However, the shear rate on the surface of the membrane by the relative movement decreases seriously as the distance between the separation membrane and the disk becomes great. If the distance between the separation membrane and the disk becomes small in order to increase the shear rate, the separation membrane and the disk may contact with each other by the pressure difference between both sides of the disk to cause the damage on the membrane, so the precise treatment and accurate assembly are required to prevent such a problem, which may cause the increase of the manufacturing costs. Furthermore, the pressure decrease occurs as the fluid flows along the long passage formed by the piled separation membrane—disk—separation membrane structure, and the fluid has to be supplied with greater pressure in order to maintain proper filtering pressure and prevent the decrease of performance by compensating such a pressure decrease. However, that causes the increase of the driving costs and management costs, which deteriorates the economical performance of the system.

U.S. Pat. No. 6,165,365, Shear localized filtration system, and U.S. Pat. No. 6,416,666, Simplified filtration system, disclose the technique that the centrifugal force and the rotational force are applied to the fluid with the viscosity of the fluid by rotating the piled separation membranes. According to that, the movement of the fluid between the separation membranes is caused to reduce the adhesion of solid material on the surface of the membranes. Furthermore, four through sixteen, optimally eight, fixed type spokes are disposed radially between the separation membranes, which makes the pressure distribution uniform and the speed of fluid between the spokes and the membranes great to increase the shear intensity, thereby preventing the adhesion of the solid material.

The above patent describes that the spokes promote the turbulent flow phenomenon at the surface of the membranes. However, it is considered that the effect of inducing the turbulent flow is quite little, since the flow in the circumferential direction and the radial direction is laminar flow. Therefore, the spokes in the above patent only has the effects that the uniform pressure distribution is achieved in the filter pack, and the adhesion of the solid material is minimized due to the change of the speed of fluid at the surface of the membrane by the change of the volume in the space from the separation membrane.

As mentioned above, in order to minimize the adhesion of the solid material at the surface of the separation membranes, it is the best method to increase the shear rate by vitalizing the flow around the separation membranes. However, the increase of the shear rate of the fluid at the surface of the membranes merely with the change of the speed of fluid by the relative movement of separation membrane—disk— separation membrane, or separation membrane—spoke— separation membrane construction in the conventional art proposed under such a purpose is limited.

SE 451429 and SE 459475 disclose the separation apparatus having separation membrane—rotor—separation membrane construction which is different from the above separation membrane—disk—separation membrane, or separation membrane—spoke—separation membrane construction. In those patents, the rotor is shaped into not the disk but a bar, so the rotation of the rotor causes not only the shear flow but also the turbulent flow between the separation membranes. It provides low loss of pressure since the passage between the membranes is narrow in comparison with the system having the disk type rotor, and furthermore, the bar shape rotor proposed in those patents has great influence on prevention of adhesion of solid material. However, that effect is not sufficient in fact, so the regeneration process for the separation membranes has to be performed regularly.

According to the above-mentioned SE 451429, the regeneration process for the separation membranes is the process that a mechanical element such as a brush or a valve is attached on the blade of the rotor and the material adhered to the surface of the separation membrane is removed by rotating it, which has the shortcoming that the porous coating on the surface of the separation membrane is also removed during that process. In order to compensate such a shortcoming, the surface of the membrane is newly coated, however, such a mechanical separation membrane regeneration process cannot maintain the required size of the pores as desired, and the separation membrane has to be exchanged with a new one when the regeneration is not easy. The above-mentioned SE 459475 proposes the method to increase the capacity by piling up the filter units.

U.S. Pat. No. 6,027,656 proposes a separation device that does not require the mechanical regeneration process since the stronger turbulent flow is induced between the membranes with the rotor of which shape is modified from the bar shape rotor. However, stronger turbulent flow is not expected since the employed rotor merely consists of two blades. Furthermore, the speed of the rotor is a sole factor in controlling the magnitude of the turbulent flow according to the kind or status of the fluid to be processed, so it is very hard to separate various kinds of liquid of various characteristics. In order to compensate such a shortcoming, the above-mentioned patent has proposed a method to equip an ultrasonic wave or electric field generation apparatus together with the rotors having various cross sectional shapes.

As describes so far, the most effective method for preventing the most significant problem, the adhesion of foreign substance on the surface of the membranes, in the liquid-liquid or liquid-solid separation apparatus using the separation membranes is to make the shear stress at the surface of the membranes as great as possible. It is necessary to generate the turbulent flow for such a purpose, however, the method that has been proposed so far can generate the turbulent flow within a limited range. In particular, the unit in U.S. Pat. No. 6,027,653, which is expected to induce the stronger turbulent flow than the filter unit of rotary type separation membrane—fixed type spoke construction in U.S. Pat. No. 6,165,365 or than the filter unit of separation membrane—disk—separation membrane construction, employs the rotor having only two blades, so the turbulent flow is generated locally and the rotational speed has to be greater for the stronger turbulent flow.

Furthermore, although the fluid of different characteristics about the density, viscosity, etc. requires turbulent flows of different strength, the turbulent flow of desired magnitude can be achieved only by the change of the rotational speed of the rotor since the shape of the rotor is fixed. Therefore, the rotational speed has to be greater to generate the stronger turbulent flow regarding to the fluid of greater viscosity and density, which causes the increase of the required driving energy and the loss of the energy.

DISCLOSURE OF INVENTION

Technical Problem

The present invention has been proposed to overcome the above problems, and it is the object of the present invention to provide a rotor for generating vortex water flow, and a rotary type separation membrane filtering apparatus employing the same, which can generate vortex water flow having sufficient shear intensity with respect to the separation membrane with low driving energy, and also can generate optimized turbulent flow (especially, vortex water flow) that is appropriate for the separation process of the fluid of different characteristics.

Technical Solution

To achieve the above-described objects, the present invention provides a rotor for generating vortex water flow, comprising: a plurality of first blades extended in a radial direction from a rotational axis thereof; and a plurality of second blades extended in the radial direction from the rotational axis, and disposed at positions different from positions of the first blades in a direction of the rotational axis.

According to the first preferable embodiment of the present invention, the first blades and the second blades have widths different from each other in a circumferential direction around the rotational axis, and the first blades and the second blades are so disposed as to be overlapped with each other.

According to the second preferable embodiment of the present invention, the first blades and the second blades are disposed at positions different from each other in a circumferential direction around the rotational axis, and the first blades and the second blades are partially overlapped with each other.

According to the third preferable embodiment of the present invention, the first blades and the second blades are disposed at positions different from each other in a circumferential direction around the rotational axis, and the first blades and the second blades are distanced from each other in the circumferential direction. In such a situation, the first blades and the second blades are so disposed as to be distanced equally from each other in the circumferential direction.

According to the fourth preferable embodiment of the present invention, at least one of protrusion is attached on outer surfaces of the first blades and/or second blades. The protrusion is so formed as to have width varying in the circumferential direction, and for example, the protrusion is so formed as to have streamlined width in the circumferential direction, and furthermore, the protrusion is so formed as to have a rear shape curved rearward in the circumferential direction or to have a horizontal cross section of circle shape substantially. It is preferable that a plurality of protrusions are respectively attached between the first blades and the second blades, and sizes of the protrusions become greater gradually in the radial direction.

Meanwhile, the first blades and the second blades have widths same with each other in the circumferential direction, and the first blades and the second blades are disposed alternately in the circumferential direction.

According to the fifth preferable embodiment of the present invention, the first blades and the second blades are disposed so that at least a part thereof are overlapped with each other in the rotational axis direction and are disposed so as to be distanced from each other in a rotational axis direction, and at least one protrusion is disposed between the first blades and the second blades.

Meanwhile, the rotor according to the present invention comprises: a first ring formed integrally with the first blades and disposed coaxially with the rotational axis; and a second ring formed integrally with the second blades and disposed coaxially with the rotational axis. Here, the first ring and the second ring have radiuses different from each other. Therefore, the stepwise shape of end formed by the first ring and the second ring is supported by a guide so that the rotor is not contacted with the separation membrane in the filtering apparatus.

The first rotor equipped with the first blades and the second rotor equipped with the second blades can be formed integrally in a body or can be manufactured as separate members and then are attached to each other.

Meanwhile, the filtering apparatus according to the present invention comprises: a barrel having a water inflow port, a processed water discharge port, and a condensed water discharge port; at least one of rotor disposed in the barrel and having a construction depicted in one of claims 1 through 25; and at least one of filter tray disposed alternately with the rotors in the barrel.

The filter tray is fixed in the barrel, and has at least one of water passage port so formed as to penetrate a plane thereof. The water in the barrel can flow smoothly in the barrel through the water passage port.

The filter tray includes a supporting plate having a disk shape, a drain cloth attached on both surface of the supporting plate, and a separation membrane attached to an outer surface of the drain cloth, and the drain cloth and the separation membrane are adhered onto the supporting plate with thermosetting adhesive. Thus, the manufacturing process becomes simple.

According to the present invention, the pollutant material adhered to the separation membrane can be removed effectively since various types of vortex water flow are generated over wide range. Therefore, the efficiency of the filtering apparatus in processing the polluted water increases, and the energy loss of the filtering apparatus is reduced. Furthermore, sufficient vortex water flow can be generated with low energy even for the fluid of different characteristics such as density or viscosity.

BRIEF DESCRIPTION OF THE DRAWINGS

FIG. 1 is a cross sectional view of the rotary type separation membrane filtering apparatus according to the present invention;

FIG. 2 is a view showing the filtering unit in FIG. 1;

FIG. 3 is a partial sectional view of the filter tray in FIG. 2;

FIG. 4 is a perspective view of a rotor for generating vortex water flow according to the first embodiment of the present invention;

*FIG. 5 is a sectional view along the line I-I of FIG. 4;

FIG. 6 is an enlarged view of part A in FIG. 1 including the cross section along the line I'-I' of FIG. 4;

FIG. 7 is a view showing the vortex water flow generated by the operation of the rotor shown in FIG. 4;

FIG. 8 is a perspective view of the rotor for generating vortex water flow according to the second embodiment of the present invention;

FIG. 9 is a cross sectional view along the line II-II of FIG. 8;

FIG. 10 is a view showing the vortex water flow generated by the operation of the rotor shown in FIG. 8;

FIG. 11 is a perspective view of the rotor for generating vortex water flow according to the third embodiment of the present invention;

FIG. 12 is a cross sectional view along the line III-III of FIG. 11;

FIG. 13 is a view showing the vortex water flow generated by the operation of the rotor shown in FIG. 11;

FIG. 14 is a perspective view of the rotor for generating vortex water flow according to the fourth embodiment of the present invention;

FIG. 15 is a cross sectional view along the line IV-IV of FIG. 14;

FIGS. 16 and 17 are views showing the vortex water flow generated by the operation of the rotor shown in FIG. 14;

FIG. 18 is a perspective view of the rotor for generating vortex water flow according to the fifth embodiment of the present invention;

FIGS. 19 through 21 are views showing various modifications of the protrusion of FIG. 18; and FIGS. 22 and 23 are the experimental result tables showing the performance of the filtering apparatus employing the rotor for generating vortex water flow according to the present invention.

BEST MODE FOR CARRYING OUT THE INVENTION

Hereinbelow, the preferable embodiments of the present invention will be described in greater detail with reference to the accompanying drawings.

FIG. 1 is a cross sectional view of the filtering apparatus employing the rotor for generating vortex water flow according to the present invention. The present invention proposes a rotary type separation membrane filtering apparatus, and more particularly, a filtering apparatus having fixed type separation membranes and rotary type rotors.

The filtering apparatus 50 is comprised of a barrel 60, and a plurality of filter trays 70 and rotors 80 piled up in the barrel 60. The barrel 60 has a water inflow port 61, a processed water discharge port 65, and a condensed water discharge port 63. The filter tray 70 is fixed on the inner side of the barrel 60 by bolts 91, and the rotor 80 is rotatably installed in the barrel 60 by a rotational shaft 95. The filter tray 70 and the rotor 80 have the shape of a disk, and are arranged alternately in the barrel 60.

When the water containing pollutant material flows into the barrel 60 through the water inflow port 61, the pollutant material in the water is filtered by the filter tray 70 to a clean processed water and then is discharged outside through the processed water discharge port 65, and the condensed water in which the pollutant material is condensed is discharged outside of the barrel 60 through the condensed water discharge port 63. In such a situation, the rotors 80 are rotated continuously by a motor (not shown) that rotates the rotational shaft 95 during the filtering operation of the filtering apparatus 50, and the solid state pollutant material adhered to the membrane of the filter tray 70 is removed from the membrane by the shear force generated in that situation. The removed pollutant material is discharged outside through the condensed water discharge port 63 while being contained in the condensed water.

FIG. 2 shows the status that the filter trays 70 and the rotors 80 in FIG. 1 are piled. As the filter trays 70 and the rotors 80 are arranged alternately, the filter tray 70a at the upper area and the filter tray 70b at the lower area constitute one filtering unit together with the rotor 80 disposed between them. In one filtering unit, the rotor 80 removes the solid state pollutant material on the membrane attached on the lower side of the upper filter tray 70a and the upper side of the lower filter tray 70b.

FIG. 3 shows the detailed construction of the filter tray. The filter tray 70 is comprised of a supporting plate 71 having a disk shape, drain cloths 73 respectively attached to the upper and the lower sides of the supporting plate 71, and the membranes 75 attached on the outer side of the respective drain cloths 73. The supporting plate 71 is made of stainless steel, and maintains the disk shape appearance of the filter tray 70. A plurality of fixing portions 72 fixed on the inner side of the barrel 60 by the bolts 91 are prepared at the outer edge of the supporting plate 71. The membranes 75 filter the inflow water, and the drain cloths 73 supports the membranes 75 to maintain the outer appearance of the membranes 75 and simultaneously guides the filtered water toward the processed water discharge port 65.

Two water passage ports 79 are formed on the plane of the respective filter trays 70.

The water flows smoothly in the barrel 60 through the water passage ports 79.

The basic construction and the operation of the rotary type separation membrane filtering apparatus are the same with those of the conventional art, so the detailed description about the construction of the filtering apparatus is omitted, and the construction of the rotor for generating vortex water flow according to the present invention will be described in detail hereinafter.

The rotor for generating vortex water flow according to the present invention is characterized in that it includes a plurality of first blades and a plurality of second blades arranged in positions different from each other in the rotational direction thereof. Hereinbelow, the respective embodiments that implement such a characteristic of the present invention will be described.

FIG. 4 is a view showing the first embodiment of the rotor for generating vortex water flow according to the present invention, and FIG. 5 is a sectional view along the line I-I of FIG.

The rotor 100 for generating vortex water flow according to the first embodiment of the present invention is comprised of a first rotor 110 and a second rotor 120. An assembly ring 150 assembled with the rotational shaft 95 of the filtering apparatus 50 is prepared at the central area of the rotor 100, and the assembly ring 150 is assembled with the first rotor 110 and the second rotor 120. Accordingly, the rotor 100 assembled with the rotational shaft 95 through the assembly ring 150 is rotated by the rotational shaft 95 when the rotational shaft 95 is rotated.

The first rotor 110 has a plurality of first blades 111 extended from the rotational axis in the radial direction thereof. A first assembly portion 115 having a shape of a ring assembled with the assembly ring 150 is prepared at the central area of the first rotor 110, and a first ring 117 for connecting the first blades 11 with each other is prepared at the outer area of the first rotor 110. The first blades 111, the first assembly portion 115 and the first ring 117 are formed in a body. Accordingly, the first rotor 110 has the overall shape of a spoke type wheel.

The second rotor 110 also has the second blades 121, the second assembly portion 125 and the second ring 127 of which construction is the same as that of the first rotor 110.

As described above, the first blades 111 and the second blades 121 are disposed at positions different from each other along the rotational axis of the rotor 100. In other words, the first blades 111 and the second blades 121 are arranged consecutively in the rotational axis direction. Further, in the present embodiment, the first blades 111 and the second blades 121 are so formed as to have widths different from each other in the circumferential direction around the rotational axis, and more particularly, as shown in FIG. 5, the width of the second blades 121 is smaller than the width of the first blades 111, and simultaneously, the first blades 111 and the second blades 121 are overlapped with each other. The first rotor 110 and the second rotor 120 having the above construction are attached to each other by an electrical welding, ultrasonic wave welding or the like. Furthermore, the first rotor 110 and the second rotor 120 can be manufactured integrally as a single member.

Meanwhile, the radius of the first ring 117 of the first rotor 110 is greater than the radius of the second ring 127 of the second rotor 120. Accordingly, as shown in FIG. 6, which is the enlarged view of the part A of FIG. 1 including the cross section of FIG. 4 along the line I'-I', the outer end of the rotor 100 has the shape of steps. (The rotor 100 in FIGS. 4 and 5 are turned upside down for the convenience of illustration, however, the rotor 100 shown in FIGS. 4 and 5 is disposed in the barrel 60 while it is turned upside down as shown in FIG. 1) As shown in FIG. 6, a guide 60a is formed on the inner side of the barrel 60, and the guide 60a is in contact with the outer end of the rotor 100 so that the outer side of the first rotor 110 is supported by the guide 60a. Therefore, the rotor 100 is not drooped.

FIG. 7 is a view showing the vortex water flow generated between the upper filter tray 70a and the lower filter tray 70b while the rotor 100 according to the first embodiment of the present invention is rotating. In the present embodiment, as the widths of the upper blades and the lower blades are different from each other, the position that the vortex water is generated by the upper blades 111 at the rear area in the rotational direction is different from the position that the vortex water is generated by the lower blades 121 at the rear area in the rotational direction. Thus, more complex vortex water flow can be generated effectively in comparison with the case that the conventional rotor having the spoke of a single layer is rotated.

FIG. 8 is a perspective view showing the rotor according to the second embodiment of the present invention, and FIG. 9 is a cross sectional view of FIG. 8 along the line II-II. In the embodiments hereinafter, the construction of the rotor having the first rotor and the second rotor and the construction of the assembly portion and the ring at the respective sub-rotors are the same as those of the first embodiment. Therefore, only the construction of the blades is described in the illustration hereinafter.

In the second embodiment, the first blades 211 and the second blades 221 are disposed at positions different from each other also in the circumferential direction around the rotational axis of the rotor 200. More particularly, the first blades 211 and the second blades 221 have the same shape and width with each other, and only the arranged positions thereof are different.

As shown in FIGS. 8 and 9, the first blades 211 and the second blades 222 are partially overlapped with each other, in other words, about half of the width thereof is overlapped. According to such a construction, as shown in FIG. 10, the position that the vortex water is generated by the upper blades 211 at the front area and the rear area in the rotational direction is different from the position that the vortex water is generated by the lower blades 221 at the front and the rear area in the rotational direction. Thus, more complex vortex water flow can be generated effectively in comparison with the case that the conventional rotor having the spoke of a single layer is rotated.

FIG. 11 is a view showing the rotor for generating vortex water flow according to the third embodiment of the present invention, and FIG. 12 is a cross sectional view of FIG. 11 along the line III-III.

In the third embodiment, the first blades 311 and the second blades 321 are disposed at positions different from each other also in the circumferential direction around the rotational axis of the rotor 300, and furthermore,are distanced from each other in the circumferential direction. Furthermore, the first blades 311 and the second blades 321 are so disposed as to be distanced equally from each other in the circumferential direction. The width and the shape of the first blades 311 and the second blades 321 are same with each other. Therefore, as shown in FIG. 12, the first blades 311 and the second blades 321 are arranged in a zigzag manner.

According to such a construction, the vortex water flow as shown in FIG. 13 is formed. As shown in FIG. 13, the respective blades 311 and 321 generate respective vortex water flows due to the shape of a spoke, and furthermore, generate large sinusoidal water flow by the zigzag arrangement thereof. Accordingly, more complex water flow is generated.

FIG. 14 shows the rotor for generating vortex water flow according to the fourth embodiment of the present invention, and FIG. 15 is a cross sectional view of FIG. 14 along the line IV-IV.

The rotor 400 of the fourth embodiment has the first blades 411 and the second blades 421 having the same construction with those in the third embodiment, and furthermore, a plurality of protrusions 413 and 423 are attached on the outer surface of the respective blades 411 and 421. A plurality of protrusions 413 and 423 can be attached to all blades 411 and 421, one protrusion 413, 423 can be attached to all blades 411 and 421, and the protrusions 413 and 423 can be attached to a part of the blades 411 and 421 selectively. When the plural protrusions 413 and 423 are attached to the respective blades 411 and 421, it is preferable that the size of the plural protrusions 413 and 423 becomes great gradually along the radial direction of the rotor 400.

The protrusions 413 and 423 can be attached to the respective blades 411 and 421 after they are manufactured as separate members, and can be formed in a body with the respective blades 411 and 421. Furthermore, the protrusions 413 and 423 can have the widths varying in the circumferential direction, and preferably, they can have the shape that the horizontal cross section has a disk shape as shown in FIG. 14. Moreover, it is preferable that the protrusions arranged in one blade have the sizes that become greater in the radial direction of the rotor in order to generate the vortex water flow effectively.

Furthermore, as shown in FIG. 14, the protrusions 413 of the first blades 411 are attached to the upper side of the first blades 411 and the protrusions 423 of the second blades 421 are attached to the lower side of the second blades 421. Therefore, the respective protrusions 413 and 423 are arranged to protrude inward with respect to the surface of the disk-shaped rotor 400.

FIGS. 16 and 17 show the vortex water flow generated by the rotor 400 according to the fourth embodiment of the present invention as described above, in which FIG. 16 shows the side view and FIG. 17 shows the plan view.

As shown in FIG. 16, the generated vortex water flow in the side view is similar to that of the first embodiment as shown in FIG. 17 at the area that the protrusions 413 and 423 are formed, and is similar to that of the third embodiment as shown in FIG. 13 at the area that the protrusions 413 and 423 are not formed. Accordingly, the complex vortex water flow in which two kinds of water flows are combined is formed as shown in FIG. 16. Furthermore, as shown in FIG. 17, the vortex water flow in plan view is complex water flow in which small vortexes are generated at the rear area of the protrusions 413 and 423. Therefore, more complex vortex water flow is generated according to such a construction.

FIG. 18 shows the rotor according to the fifth embodiment of the present invention, and FIGS. 19 through 21 show various modifications of the protrusions shown in FIG. 18.

In the present embodiment, the first rotor 510 and the second rotor 520 are distanced from each other in the rotational axis direction. Therefore, the first blades 511 and the second blades 521 are distanced from each other in the rotational axis direction, thereby forming a certain amount of gap between both of them. Further, the first blades 511 and the second blades 521 are formed so that at least a part of them (all the part of them in the embodiment shown in FIG. 18) are overlapped with each other.

At least one of protrusion 530 is formed between the first blades 511 and the second blades 521. As in the fourth embodiment, the number and the arrangement of the protrusions 530 can be modified in a variety of manners. The difference from the fourth embodiment is that the protrusions 530 are arranged between two sub-rotors having the shapes identical to each other.

The protrusions 530 are formed to have width varying in the circumferential direction of the rotor 500 and are formed to have the streamlined width in the rotational direction of the rotor 500. For example, the protrusions 530a can be formed to have horizontal cross section of triangle shape as shown in FIG. 19, and the protrusions 530b can be formed to have the triangle shape basically and the rear part in the rotational direction is curved to protrude rearward as shown in FIG. 20. According to such a shape, the front part in the rotational direction undergoes the little resistance of water to result in low loss of rotational energy, and the rear part in the rotational direction generates the vortex water flow effectively. Furthermore, as shown in FIG. 21, the protrusions 530c can be formed to have the cross section of circle shape substantially. (FIGS. 19 through 21 show the states that the second rotor 520 is disassembled in order to illustrate the shape of the protrusions clearly.)

According to such an embodiment, the vortex water flow as shown in FIG. 17 which shows the vortex water flow formed by the above fourth embodiment is generated.

According to the variety of embodiments of the present invention as described above, the fluid between the surfaces of the blades in the rotating rotor and the surfaces of the fixed membranes can flow faster, so the adhesion of solid material can be prevented by the stronger shear intensity on the surfaces of the membranes. Furthermore, the vortex water flow at the rear area of the respective blades of the rotating rotor causes the sinusoidal speed distribution in the vertical and the horizontal direction with respect to the surface of the membrane at the surface of the separation membrane of the filtering plate, which can prevent the adhesion of the solid material by vitalizing the movement of the solid material near the surfaces of the membranes.

Comparing the vortex water flow generated by rotating the rotor proposed in the conventional art, U.S. Pat. No. 6,027,656, at the angular speed sufficient to generate the turbulent flow with the vortex water flow generated by rotating the rotor with multiple blades according to the present invention at the same speed, the vorticity of the rotor according to the present invention is relatively greater. In particular, the zigzag type rotor of third embodiment (FIG. 11) is superior in generating the vortex water flow with the smooth flow, and the shape of the rotor of fourth embodiment (FIG. 14) can generate vortex water flow in the circumferential direction as well as in the radial direction, so the cleaning effect can be achieved on overall area of the channel.

FIGS. 22 and 23 are the experimental result tables showing the comparison result of the performance of the rotor according to the present invention with that of the bar type rotor disclosed in the above-mentioned U.S. Pat. No. 6,027,656. As shown in the figures, the multi-blade type rotor according to the present invention results in double the performance of the conventional bar type rotor under the same operation condition such as supplying pressure or operating speed, and in the aspect of the processing amount, the consumed energy is 50% through 60% of that of the bar type rotor in processing the same amount of water. That means the face that the multi-blade type rotor of the present invention shows the improved efficiency of about 300% in comparison with the bar type rotor, which is superior effect over the conventional products.

Meanwhile, the conventional filter tray has the complex sealing structure for fixing the separation membranes and the drain cloths, however, the filter tray 70 of the present invention as shown in FIG. 3 has the construction that the separation membranes 75 and the drain cloths 73 are attached onto the supporting plate 71 with thermosetting adhesive. According to such a method, the manufacturing process is simplified and the productivity increases.

In the present invention, the passage through which the slurry is supplied and then is discharged is constituted by two water passage ports 79 formed on the filter tray 70, so it is needless to form separate passage outside of the filter tray 70. Accordingly, the size of the system can be reduced as much as 120% or more in the aspect of area, so the processing efficiency per unit area increases.

INDUSTRIAL APPLICABILITY

According to the present invention, the pollutant material adhered to the separation membrane can be removed effectively since various types of vortex water flow are generated over wide range. Therefore, the efficiency of the filtering apparatus in processing the polluted water increases, and the energy loss of the filtering apparatus is reduced. Furthermore, sufficient vortex water flow can be generated with low energy even for the fluid of different characteristics such as density or viscosity.

The invention claimed is:

1. A filtering apparatus comprising:
a barrel having a water inflow port, a processed water discharge port, and a condensed water discharge port;
at least one rotor for generating vortex water flow disposed in the barrel, wherein the rotor comprises a plurality of first blades in a first plane extending in a radial direction from a rotational axis thereof, and a plurality of second blades in a second plane extending in the radial direction from the rotational axis in a second plane adjacent to but removed from the first plane alone the rotational axis and the second blades disposed at positions different from positions of the first blades in a direction of the rotational axis, the blades in one plane not extending into the other plane, and
at least one filter tray disposed alternatively with the rotors in the barrel.

2. The filtering apparatus as claimed in claim 1, wherein the first blades and the second blades have widths which differ from each other in a circumferential direction around the rotational axis in the first and second planes respectively.

3. The filtering apparatus as claimed in claim 2, wherein the first blades and the second blades are so disposed as to be overlapped with each other in the first and second planes respectively.

4. The filtering apparatus as claimed in claim 1, wherein the first blades and the second blades are disposed at positions different from each other in a circumferential direction around the rotational axis in the first and second planes respectively.

5. The filtering apparatus as claimed in claim 4, wherein the first blades and the second blades are partially overlapped with each other in the first and second planes respectively.

6. The filtering apparatus as claimed in claim 4, wherein the first blades and the second blades are distanced from each other in the circumferential direction.

7. The filtering apparatus as claimed in claim 6, wherein the first blades and the second blades are so disposed as to be distanced equally from each other in the circumferential direction.

8. The filtering apparatus as claimed in claim 4, further comprising at least one protrusion attached on at least one of the outer surfaces of the first blades and/or second blades.

9. The filtering apparatus as claimed in claim 8, wherein the protrusion is so formed as to have a width varying in the circumferential direction.

10. The filtering apparatus as claimed in claim 9, wherein the protrusion is so formed as to have streamlined width in the circumferential direction.

11. The filtering apparatus as claimed in claim 10, wherein the protrusion is so formed as to have a rear shape curved rearward in the circumferential direction.

12. The filtering apparatus as claimed in claim 9, wherein the protrusion is so formed as to have a horizontal cross section of substantially circular shape.

13. The filtering apparatus as claimed in claim 7, wherein a plurality of protrusions are respectively attached between the first blades and the second blades, and sizes of the protrusions become gradually greater in the radial direction.

14. The filtering apparatus as claimed in claim 4, wherein the first blades and the second blades have the same widths in the circumferential direction.

15. The filtering apparatus as claimed in claim 1, wherein the first blades and the second blades are disposed so as to be overlapped with each other in the rotational axis direction in the first and second planes respectively, and
at least one protrusion is disposed on at least one of the first and second blades and extending between the first blades and the second blades.

16. The filtering apparatus as claimed in claim 15, wherein the protrusion is so formed as to have a width varying in the circumferential direction.

17. The filtering apparatus as claimed in claim 16, wherein the protrusion is so formed as to have a streamlined width in the circumferential direction.

18. The filtering apparatus as claimed in claim 17, wherein the protrusion is so formed as to have a rear shape curved rearward in the circumferential direction.

19. The filtering apparatus as claimed in claim 16, wherein the protrusion is so formed as to have a horizontal cross section of substantially circular shape.

20. The filtering apparatus as claimed in claim 15, wherein a plurality of protrusions are respectively attached between the first blades and the second blades, and sizes of the protrusions become gradually greater in the radial direction.

21. The filtering apparatus as claimed in claim 1, further comprising:

a first ring formed integrally with the first blades and disposed coaxially with the rotational axis and extending in the first plane; and a second ring formed integrally with the second blades and disposed coaxially with the rotational axis and extending in the second plane.

22. The filtering apparatus as claimed in claim 21, wherein the first ring and the second ring have radiuses different from each other.

23. The filtering apparatus as claimed in claim 1, further comprising a first rotor equipped with the first blades, and a second rotor equipped with the second blades;

wherein the first rotor and the second rotor are attached to each other with the first blades and the second blades being positioned in the first and second planes respectively.

24. The filtering apparatus as claimed in claim 1, further comprising a first rotor equipped with the first blades, and a second rotor equipped with the second blades;

wherein the first rotor and the second rotor are integrally formed with the first blades and the second blades being positioned in the first and second planes respectively.

25. The filtering apparatus as claimed in claim 1, wherein the filter tray is fixed in the barrel.

26. The filtering apparatus as claimed in claim 1, wherein the filter tray has at least one water passage port so formed as to penetrate a plane thereof.

27. The filtering apparatus as claimed in claim 26, wherein the filter tray includes a supporting plate having a disk shape, a drain cloth attached on both surface of the supporting plate, and a separation membrane attached to an outer surface of the drain cloth.

28. The filtering apparatus as claimed in claim 27, wherein the drain cloth and the separation membrane are adhered onto the supporting plate with thermosetting adhesive.

* * * * *